May 13, 1941.  M. BIRKIGT  2,242,169
AUTOMATIC MACHINE TOOL
Filed Dec. 28, 1938    2 Sheets-Sheet 2
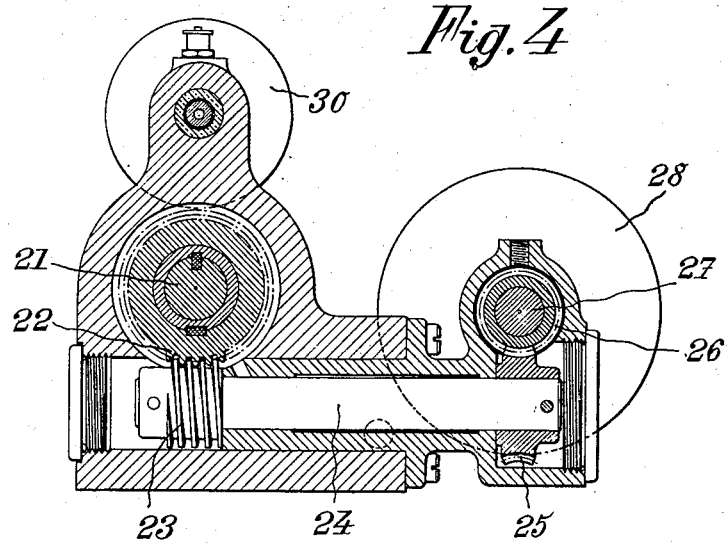
Fig. 4
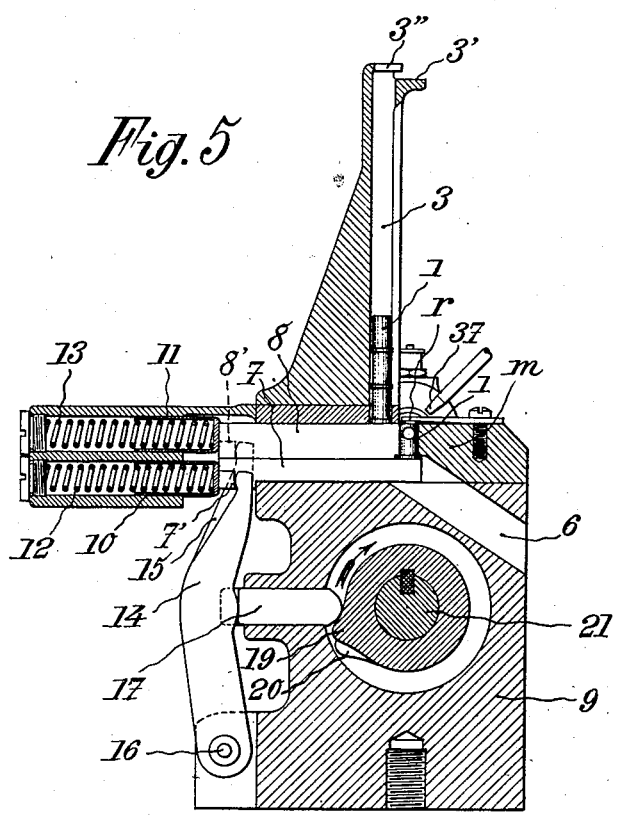
Fig. 5
Inventor:
Marc Birkigt,
 Attorneys Patented May 13, 1941

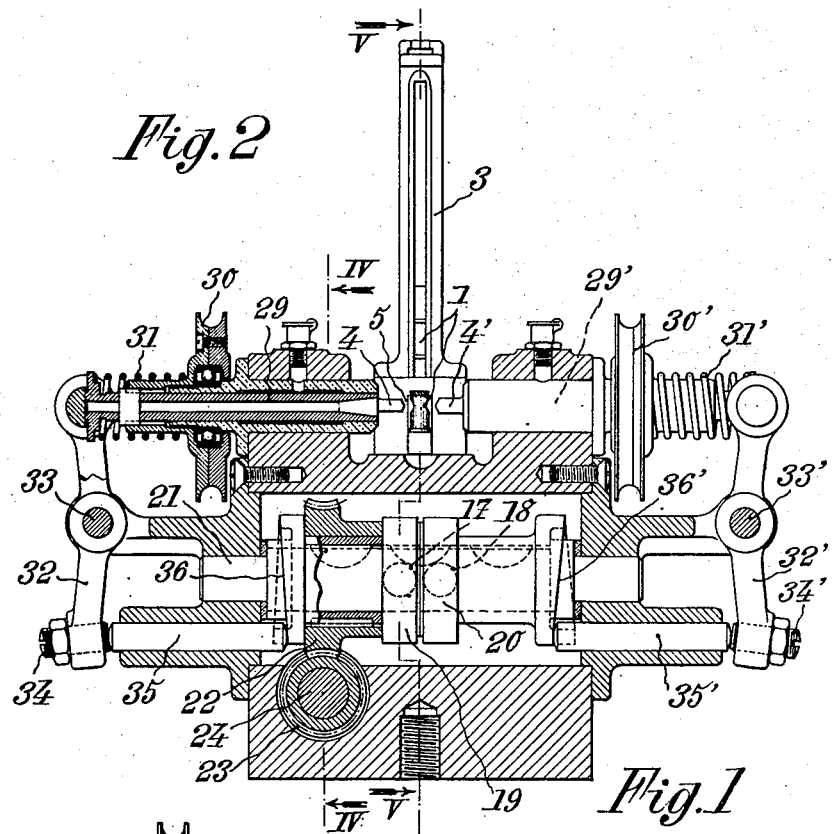
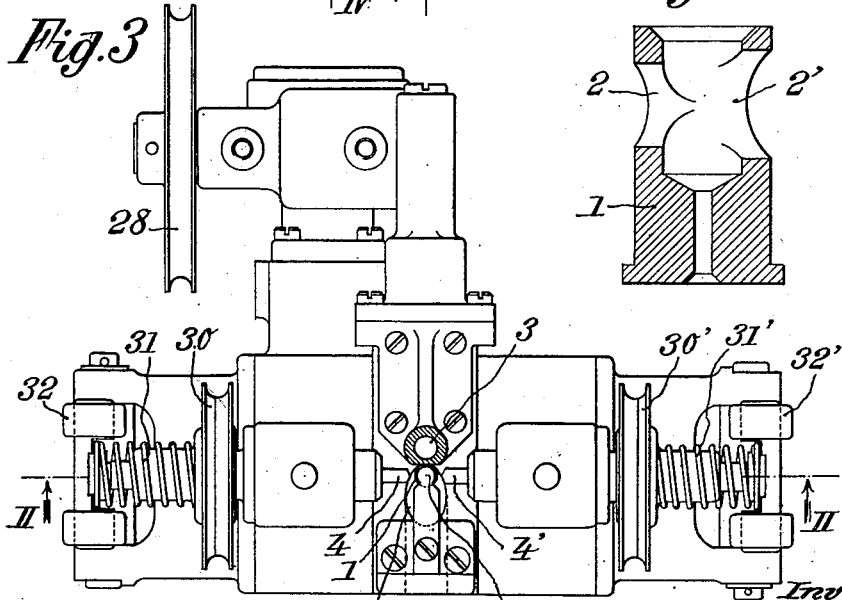

2,242,169

UNITED STATES PATENT OFFICE 2,242,169

AUTOMATIC MACHINE TOOL

Marc Birkigt, Versoix, near Geneva, Switzerland

Application December 28, 1938, Serial No. 248,132
In Belgium March 12, 1938

3 Claims. (Cl. 77—21)

The present invention relates to automatic machine tools, that is to say machine tools of the kind in which the pieces to be machined are stored in advance in a feed magazine or the like, then automatically fed in succession into a position in which they are acted upon by the tool or tools of the machine, and finally evacuated once they have been machined by the tool or tools.

The invention is more especially, although not exclusively, concerned with automatic drilling machines.

The object of the present invention is to provide an automatic machine tool of the type above described which is better adapted to meet the requirements of practice than machine tools of this kind made up to the present time.

According to an essential feature of the present invention, the mechanism for controlling the displacements of the pieces to be treated inside the machine includes a group of at least two elements adapted to be given automatic reciprocating movements in such manner that, on the one hand one of these elements, which is adapted to support the pieces to be treated in the position in which they are machined successively by the tool or tools of the machine, is moved out of the way so as to permit evacuation of these pieces after their treatment, and, on the other hand, the other element opens, at the end of one of its strokes, the outlet of the feed magazine so as to permit the introduction into the machine of at least one of the next pieces to be treated.

Advantageously, according to the present invention, this second mentioned element is further adapted, in the course of its other stroke, to bring and hold in working position the piece thus to be treated.

Other features of the present invention will result from the following detailed description of a specific embodiment thereof.

A preferred embodiment of the present invention will be hereinafter described, with reference to the accompanying drawings, given merely by way of example, and in which:

Fig. 1 is a vertical sectional view of a shell fuze ferrule or plunger for the drilling of which it is advantageous to employ the automatic machine tool according to the present invention;

Fig. 2 is an elevation sectional view of an automatic machine tool for the drilling of shell fuze ferrules or plungers of the type of that shown by Fig. 1, this view corresponding to a section on the line II—II of Fig. 3;

Fig. 3 is a side elevational view of said machine tool;

Fig. 4 is a vertical section on the line IV—IV of Fig. 2;

Fig. 5 is a vertical section on the line V—V of Fig. 2.

In the following description, it will be supposed that the automatic machine tool according to the present invention is an automatic drilling machine intended for instance to make in a piece such as a sleeve 1 (intended to constitute the ferrule which locks the pins in a shell fuze) two radial bores 2 and 2' diametrally opposed to each other, as shown by Fig. 1. But of course, the invention is not in any way limited to this application of my invention.

The machine in question includes a feed magazine 3 adapted to contain a plurality of pieces 1 to be machined.

The bores to be formed in pieces 1 at 2 and 2' are supposed to be of different diameters. In order to make these bores, I provide the machine with two drills 4 and 4' arranged in opposite relation to each other and adapted to project into a free space 5 (which will be hereinafter called "field" of these drills 4 and 4'). The pieces 1 can be housed successively in this field. The drills 4 and 4' are controlled by a mechanism which will be hereinafter specifically described.

Below this field 5 of the drills 4 and 4' I provide an outlet passage 6 through which pieces 1 can be evacuated after drilling. For instance, as shown by the drawings, said pieces drop under the effect of gravity through this passage when the latter is allowed to communicate with field 5.

Now, according to the essential feature of the present invention, the mechanism for controlling the feed of the blanks through the machine, that is to say the mechanism for successively taking the blanks 1 from magazine 3, bringing them into the field 5 of the drills, and finally evacuating the machined pieces through passage 6, is essentially constituted by a group of at least two elements 7 and 8, both capable of undergoing a reciprocating displacement and adapted to perform the following functions:

*a*. The first element, to wit 7, supports the blanks 1 when they are in field 5 and it is moved out of the way, at the end of the drilling operation, so as to permit the ejection of the machined pieces through passage 6.

*b*. The second element, to wit 8, serves to open, at the end of one of its strokes, the outlet of magazine 3, so as to ensure the introduction of the blanks 1 into field 5, preferably one by one Advantageously, and as it will be supposed in the following description, element 8 serves to bring into position for action by drills 4 and 4' the blanks 1 into field 5, preferably one by one. hold it in this position as it is being acted upon by said drills.

Of course, subject to the fulfilment of the conditions above set forth, the mechanism of operation of elements 7 and 8 can be designed in many different ways, said elements being for instance in the form of sectors or the like having an oscillating displacement. But I consider that it is particularly advantageous to give these elements rectilinear and parallel reciprocating displacements. A preferred embodiment of such an arrangement is shown by way of example by the accompanying drawings.

In this example, elements 7 and 8 are constituted by two parallel sliding members arranged below the feed magazine 3 of the machine. The sliding member 8 which cooperates with the outlet of said magazine bears upon the sliding member 7 which cooperates with the inlet of the evacuation passage 6.

The displacements of these sliding members are controlled by a driving system carried by the frame 9 of the machine, and this driving system is so designed as to cause said sliding members to produce the introduction, the setting and holding in position, and the evacuation of pieces 1, successively and in accordance with the cycle of operation above set forth.

For this purpose, I provide, in combination with sliding members 7 and 8 respectively, push pieces 10 and 11, subjected to the action of springs 12 and 13 which tend to displace said sliding members toward the field 5 of the drills.

In order to move said sliding members against the action of said springs I provide pivoting arms 14 and 15 one end of which is mounted about a fixed axis 16. The opposite ends of said arms are adapted to cooperate with abutments 7' and 8' carried by the corresponding sliding members.

These arms 14 and 15 are driven by respective push pieces 17 and 18, slidably guided in the frame 9 of the machine. These last mentioned push pieces are respectively controlled by cams 19 and 20 carried by a shaft 21 extending in a direction at right angles to that of sliding members 7 and 8.

The projecting portions of these cams, which produce the outward displacement of push-pieces 17 and 18 are preferably disposed with an angular interval of small amplitude, for instance 5°, in such manner that sliding member 8 starts moving toward the left hand side of Fig. 5 only after sliding member 7 has already been moved.

Shaft 21 is driven, through the intermediate of helical pinions 22 and 23 for instance, by a transmission shaft 24, which is itself driven, for instance through helical pinions 26 and 25, by a driving shaft 27 on which is keyed a pulley 28 receiving, from an external source, the energy necessary for driving the whole of the machine.

Finally, I provide an abutment, such for instance as a kind of jaw m, against which sliding member 8 applies a blank 1 in working position. A spring r is advantageously provided for applying said blank against sliding member 7, so that the blank is accurately positioned during the drilling operation.

The mechanism for controlling the working of drills 4 and 4' is made in any suitable conventional or other manner. However, this control mechanism must be so coupled with that for controlling the reciprocating displacements of sliding members 7 and 8 that said drills 4 and 4' are brought into action on a blank 1 only during the portion of the cycle of operation for which said blank 1 is thus immobilized in field 5.

Advantageously, the mechanism for controlling the operation of the drills 4 and 4' is arranged as shown by the drawings.

In this embodiment of my invention, the drills 4 and 4' are carried by drill-holders 29 and 29' capable of being rotated respectively by grooved pulleys 30 and 30', and these drills-holders are mounted in such manner as to be able to move, with respect to the sleeves that support said pulleys, with axial displacements against the action of return springs 31 and 31' which tend to bring them back into position of rest.

These axial displacements of the drill-holders 29 and 29' are produced by rocking members 32 and 32', pivoted in their middle portions about fixed axes 33 and 33'.

The upper ends of these rocking members 32 and 32' bear against the outer ends of the corresponding drill-holders, and their lower ends bear, advantageously through the intermediate of adjusting screws 34 and 34', on push pieces 35 and 35' respectively, operated by the corresponding cams 36 and 36' keyed on the driving shaft 21.

Advantageously, the machine according to the present invention further includes a blower nozzle 37 or the like, which opens in the direction of the field 5 of the drills, above the ends of sliding members 7 and 8. This blowing nozzle serves to drive off the metal chips before a new blank 1 is set in position, so as to eliminate any risk of these chips interfering with the proper positioning of the blank for the drilling operation.

Finally, it should be noted that it is advantageous to arrange the upper end of the feed magazine 3 in such manner that the blanks to be drilled are capable of being introduced into this magazine only when they are in the proper position, that is to say, in the case of the pieces (ferrules) that are considered, in such manner that they bear upon sliding members 7 and 8 through their ends provided with a flange (bottom of Fig. 1).

For this purpose, I may for instance, as shown by Fig. 5, provide said upper end of magazine 3 with a plate 3' provided with guiding edges 3'' forming a kind of passage the section of which corresponds to the outline of ferrule or piece 1 when the latter bears through its flange on plate 3'. The automatic drilling machine above described works as follows:

A plurality of ferrules or other blanks have already been piled up in magazine 3. The lowermost blank 1 drops onto sliding member 7 when sliding member 8 opens, near the end of its backward stroke, the outlet aperture of magazine, which opens into the field 5 of the machine. In the course of its return stroke, sliding member 8 pushes the blank thus fed to the machine into field 5, where it is securely held, in working position, between the end of said sliding member 8 and block m. Drills 4 and 4' are then brought into play. Once they have reached the end of their working stroke, they come back toward the rear under the action of springs 31 and 31'. Cams 36 and 36' are so shaped that they permit this return movement to take place at high speed.

Sliding members 7 and 8 are then moved in the backward direction. The blank that has just been drilled is thus released and evacuated through chute 6, while a new blank is introduced into the machine near the end of the recoil stroke of sliding member 8. From this time on, the same cycle of operation is repeated until all the blanks present in magazine 1 have been successively treated.

Whatever be the embodiment that is chosen, a machine built on the principle above set forth and illustrated by the above example has many serious advantages the most intersecting of which are, for instance, the following:

The mechanism for moving the ferrules is particularly simple and consequently its operation is reliable.

It permits of ensuring an identical positioning of all the blanks treated in the apparatus, so that it is possible to effect a series of drilling operations with a high accuracy.

In a general manner, while I have, in the above description, disclosed what I deem to be a practical and efficient embodiment of the present invention, it should be well understood that I do not wish to be limited thereto as there might be changes made in the arrangement, disposition, and form of the parts without departing from the principle of the present invention as comprehended within the scope of the appended claims.

What I claim is:

1. An automatic machine tool which comprises, in combination, a frame having therein a space for at least one piece to be machined and a discharge passage for the machined pieces communicating with said space, at least one tool carried by said frame adapted to act on a piece present in said space, means for moving said tool into and out of operative position, a feed magazine carried by said frame having an aperture communicating with said space, two superposed members movable in said frame with parallel rectilinear reciprocating motions, one of said members being adapted to support a piece present in said space, during the machining, means operable after said tool has been moved out of operative position to move said last member to open the communication between said space and said discharge passage for evacuation of the last mentioned piece, the other member being adapted to control the communication between said feed magazine and said space, to bring the pieces from said magazine successively into working position in said space and to hold them in said position, and means for reciprocating said second member.

2. An automatic machine tool which comprises, in combination, a frame having therein a space for at least one piece to be machined and a discharge passage for the machined pieces, communicating with said space, at least one tool carried by said frame adapted to act on a piece present in said space, means for moving said tool into and out of operative position, a feed magazine carried by said frame having an aperture adapted to communicate with said space so that blank pieces present in said magazine tend to pass through said aperture into said space, a first member movable in said frame transversely to said discharge passage adapted to support one piece above said passage, during the machining of said last mentioned piece, means operable after said tool has been moved out of operative position for imparting a rectilinear translatory reciprocating motion to said member so that it uncovers said passage and allows the last mentioned piece to drop thereinto, a second member movable in said frame on the first mentioned member in parallel relation to said first mentioned member so as to uncover said outlet aperture of said magazine and subsequently to push a piece from said magazine into working position in said space and to hold it in said position, and means, operatively connected with the means for reciprocating the first mentioned member, for driving said second mentioned member.

3. In an automatic machine tool as claimed in claim 1, in which said piece to be machined is of cylindrical form, said members holding said piece with its longitudinal axis perpendicular to the direction of movement of said members, and said tool producing an orifice in said piece having an axis perpendicular to the longitudinal axis of said piece.

MARC BIRKIGT.